United States Patent [19]

DeBoskey et al.

[11] 4,176,975

[45] Dec. 4, 1979

[54] METALLOID FILAMENT WIRE MATRIX PRINT HEAD

[75] Inventors: Wentzle R. DeBoskey; Robert A. Sebrosky, both of Raleigh, N.C.

[73] Assignee: International Business Machines Corporation, Armonk, N.Y.

[21] Appl. No.: 857,627

[22] Filed: Dec. 5, 1977

[51] Int. Cl.$^2$ .......................... B41J 3/10; C01B 35/02; C01B 31/04

[52] U.S. Cl. .................................... 400/124; 423/298; 423/448

[58] Field of Search ...................... 101/93.05; 400/124; 423/298, 345, 346, 448

[56] References Cited

U.S. PATENT DOCUMENTS

| | | | |
|---|---|---|---|
| 3,438,884 | 4/1969 | Juhola et al. | 423/298 X |
| 3,692,479 | 9/1972 | Meadows et al. | 423/345 X |
| 3,828,908 | 8/1974 | Schneider | 400/124 |
| 3,993,738 | 11/1976 | Overholser et al. | 423/448 |
| 4,016,247 | 4/1977 | Otani et al. | 423/448 X |
| 4,071,604 | 1/1978 | Schwemer | 423/448 X |

*Primary Examiner*—Paul T. Sewell
*Attorney, Agent, or Firm*—Edward H. Duffield

[57] ABSTRACT

A wire matrix print head mechanism is disclosed in which a wear and impact resistant, flexible, smooth, tough and economical metalloid element filament material is utilized as the impact print wire. The wire material's flexibility eliminates many of the problems of breakage and brittleness failures encountered in previous designs. The lower coefficient of friction and greater smoothness of the wire material lowers the magnet forces required to push the wires through wire guides in the print head. The extreme hardness of the metalloid material combined with its high flexibility and toughness facilitate the production of impact and wear resistant, easily assembled long life wire matrix print heads.

3 Claims, 10 Drawing Figures

FIG. 2A
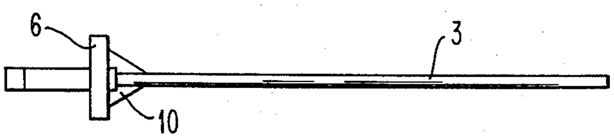
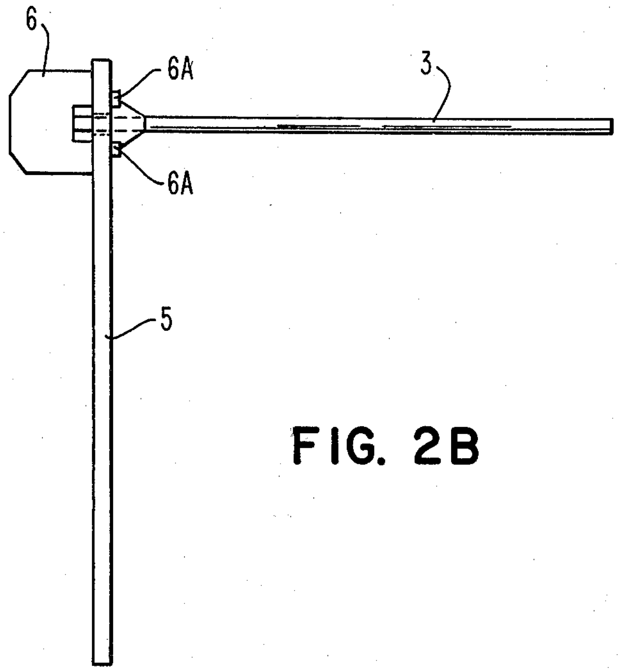
FIG. 2B
FIG. 2C
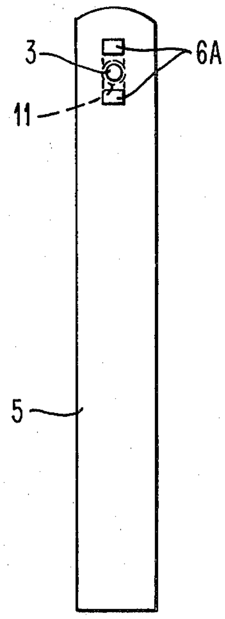
FIG. 3A
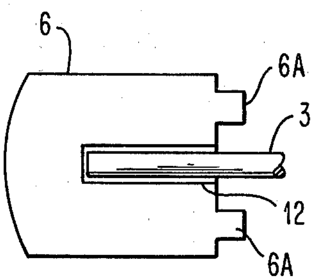
FIG. 3B
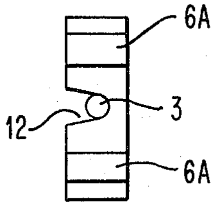

METALLOID FILAMENT WIRE MATRIX PRINT HEAD

FIELD OF THE INVENTION

This invention relates to printers in general and to wire matrix printers and print heads in particular.

PRIOR ART

Wire matrix printers and print head mechanisms therefor are exceptionally well known in the prior art. Wire matrix printers have been in existence since at least the late 1930's. The field of wire matrix printers has developed essentially along two lines based on the driver design utilized for driving the wires. There are electromagnetic solenoids which impart the axial motion in the wire matrix print wire and there are armature and magnet combinations which tend to move the end of the print wire through a small arc as it is reciprocated in the axial direction to provide the printing motions. Typical of the latter type design are U.S. Pat. Nos. 3,672,482 and 3,592,311 assigned to a common assignee herewith. Other examples of this same general type of armature and electromagnet design are found in U.S. Pat. Nos. 3,991,869, 3,994,381, 2,129,065, 2,869,455, 3,217,640, 3,750,792 and 3,627,096 to name but a few.

Wire matrix printers which employ the moving solenoid type of design may be found in U.S. Pat. Nos. 3,994,382, 3,833,105, 3,291,276 and 3,991,871 for example.

A common feature which all of the foregoing patents share is that an electromagnetic driver is utilized directly or indirectly to apply the axial driving forces to the individual wires in the wire matrix printer. Because a relatively large driver structure exists at the driving end of the print wire and the output ends of the print wire (the impact ends thereof) must be bunched closely together, a good deal of flexure or bending exists in many of the prior art print head designs. The wires therefore must fan out from their impact ends to their driver ends. This fact accounts for many of the designs shown in the aforementioned prior art patents. The economical design of guiding means to maintain the wires in an appropriate fanned out path without breaking them or creating undue flexure fatigue, wear, or unduly high frictional forces is a significant design problem.

The complexity of the designs utilized has been a major source of cost in some of the prior art designs and has also contributed to the difficulty of maintenance and repair for such designs. In order to overcome the relatively high frictional and impact forces which are imposed upon the small diameter printing wires, recourse has been had to relatively hard and brittle impact surfaces in some of the designs. For example, tungsten or tungsten carbide wires have been utilized in the past because of the high hardness and good impact resistance and wear qualities for these materials. Similarly, high carbon steel, music wire or other tough, flexible and hard metal wire impactors, or "needles" as they are sometimes called, have been used. With the recourse to hard, brittle and expensive tungsten carbide materials, for example, the assembly operation has been made more expensive due to breakage of the wires which cannot successfully withstand a high degree of flexure or bending either in the assembly operation or in use. Furthermore, because of the abrasive qualities of such materials due to their surface finish, a good deal of effort has been put forth in providing jeweled guides, low flexure guides, filled polymer guides, straight line approximations in the wire guides and other similar innovations in an attempt to simplify assembly, reduce breakage and increase the life of the print head itself.

Relatively high printing forces, which may be on the order of one to two pounds for a six copy, five carbon printing task, for example, require print wire wear and impact resistant qualities. These are frequently provided by the use of tungsten carbide wires or tips for the wires or by the use of high carbon steel metal wires or the like. These have been a common and generally adopted design preference. Accordingly, a good deal of effort has been expended in developing high strength, long life operative mechanisms for driving the printing wires or needles such as shown in the aforementioned patents. Force modification, force absorbtion and force biasing means as shown in many of the patents, and the use of wear resistant surfacing, jeweled guides and the like to resist the wearing action brought about by the flexure of the wire and the frictional forces which it imparts against the guide means have also been the object of much design effort.

In view of the foregoing difficulties and problems inherent in the basic technology of print heads according to the various designs outlined above, a continuing effort has been expended in attempting to find inexpensive and satisfactory mutual solutions to many of the foregoing problems.

OBJECTS OF THE INVENTION

In light of the foregoing known difficulties with the prior art designs for wire matrix print heads, it is an object of this invention to provide an improved wire matrix print head in which a flexible, wear resistant, impact resistant and low friction material is utilized in place of the metallic or intermetallic print wire compound materials employed in the prior art.

Another object of this invention is to provide an improved print wire for general use in wire matrix printers which is made of an inexpensive, flexible, relatively hard and wear resistant, non-abrasive material.

Yet another object of the present invention is to provide an improved wire matrix printer wire which is not as brittle, easily breakable and difficult to maintain and/or assemble as many of the prior art designs have utilized.

SUMMARY

The foreging objects and still others not enumerated are successfully met in the present invention by utilizing exceptionally hard and high strength, continuous, unitary, non-metallic filaments of materials such as the group 3A metalloid element boron as the wire matrix print wires. Filaments of this material have long been known to have good flexibility, high tensile strength and excellent flexural properties. For these properties boron filament materials have long been employed as the basic structural fibers in composite fiber and resin, or similar matrix bonded composites, in articles intended for high stress, low weight applications. Resin bonded glass fibers, resin bonded carbon fibers and a wide variety of metallic matrix bonded boron, silicon carbide and other similar composite structure materials have been developed and employed. However, a generally unrecognized or unused property of the fiber materials like boron has been their high hardness. Boron, in particular exhibits a high relative hardness.

Boron continuous fiber manufacturing has proceeded to the point where, as intended for structural composite use, continuous unitary filament boron material is readily available. The composite structure usages for this and other filamentary materials such as silicon carbide, graphite, etc., are numerous and are well known. What has not been considered heretofore is that the material itself is capable of being employed for its own intrinsic properties outside of a matrix composite.

It has been unexpectedly discovered that such non-metallic fiber materials, and in particular boron, may be successfully employed as the wire matrix printing wire itself and simultaneously overcome many of the aforementioned prior art wire matrix printer difficulties. This is the course adopted in the present invention and has resulted in a long life, high strength, and inexpensive print head in which the wires themselves are no longer brittle but in contrast, are flexible, smooth and tough and able to withstand a high degree of bending. They are wear resistant and impact resistant to a high degree and are capable of withstanding the relatively high print forces required for printing multiple copies. Because of the reduced mass of the metalloid element boron material as against the normally employed tungsten carbide or high strength steel, and because of the lower coefficient of friction and high relative hardness of the material, and because of the increased flexibility of this material, print wire breakage has been reduced or substantially eliminated. Additionally, lower driving magnet forces are required for pushing the wires back and forth in a printing motion and an improved total life at high quality printing output has been obtained.

BRIEF DESCRIPTION OF THE DRAWINGS

The foregoing objects are met according to the present invention which is further shown and illustrated with reference to a preferred embodiment thereof depicted in the figures as follows.

FIG. 2A through 2C illustrate plan, side elevation, and end elevation views, respectively, of a spring, armature and non-metallic fiber print wire assembly according to the present invention.

FIG. 3A and 3B illustrate one preferred means of attaching metalloid print wires to the magnetic armature for use in conjunction with an electromagnetic print wire driver.

Turning now to FIG. 1, an exploded view of a typical wire matrix print head assembly utilizing the preferred metalloid Boron print wire of the present invention is shown. The design illustrated is of the electromagnetic armature and coil type but it will be instantly appreciated by those of skill in the art that the solenoid core or linear driving type as typically embodied in U.S. Pat. No. 3,994,382, for example, could also employ the present invention without modification. The print head schematically illustrated in FIG. 1 may be seen to contain several base elements. These elements and the total assembly may be seen in full description and detail in U.S. Pat. No. 3,672,482 for example, assigned to the common assignee hereof, which patent is therefore specifically incorporated herein as a teaching of the structure for a wire matrix print head, guide and driver assembly. An electromagnetic driver 1, which comprises an electrically conductive winding and a pole piece 2, is employed for each print wire 3 in the wire matrix array utilized in a dot matrix printer of this type. The driver 1 also has a flux path return member 4 which may advantageously be designed as a support for the various elements as well, and a return spring 5 and armature 6 which is magnetically attracted by the electromagnetic driver assembly 1.

Figure 1:
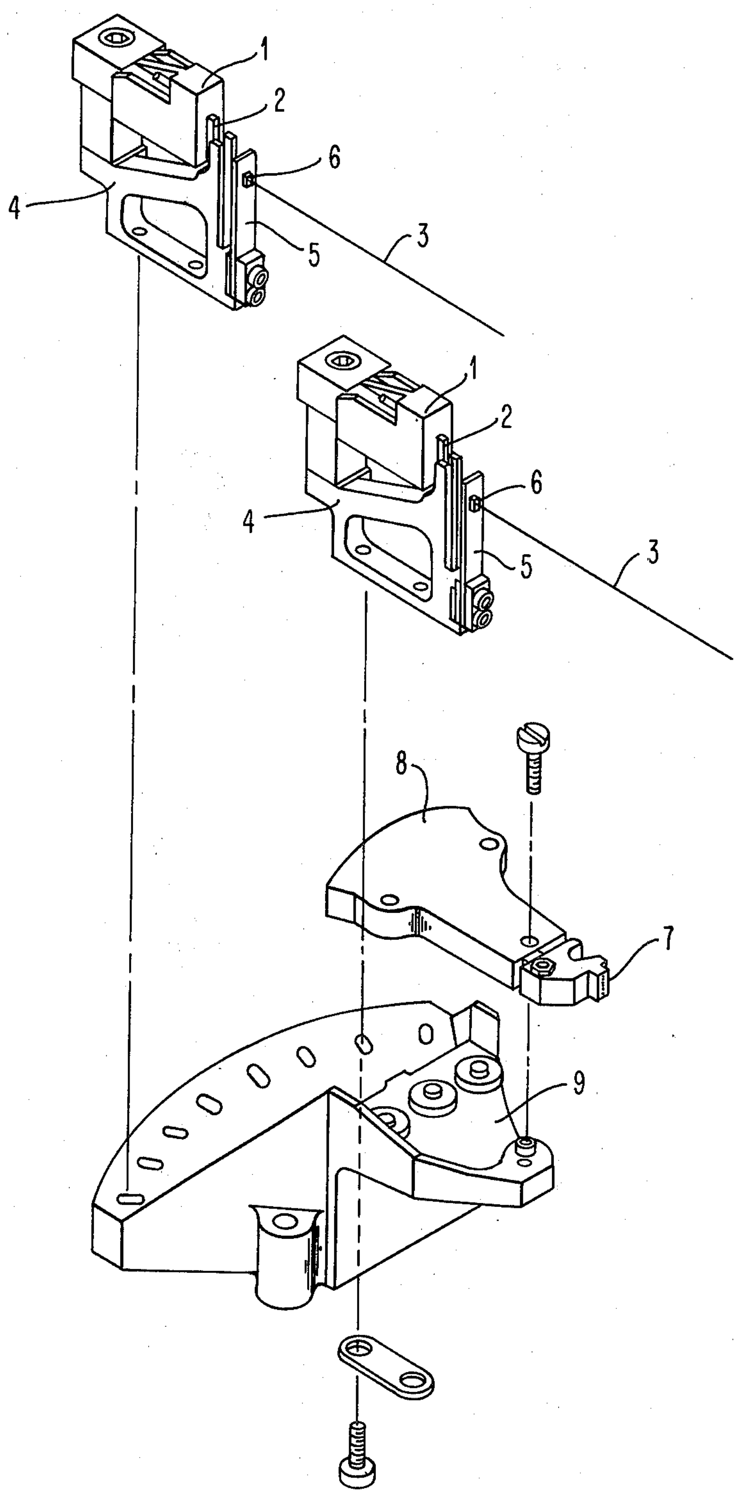
FIG. 1 illustrates an exploded, simplified view of a typical wire matrix print head assembly.

Individual wires 3, since their driven ends must be spaced relatively far apart to accommodate each of the electromagnetic driver assemblies 1, must be brought together at the output 7 by means of a guide or series of guide channels enclosed in a guide such as guide 8. The guide 8, the individual electromagnetic drivers, flux return paths and armatures, springs, etc., may all be supported on a base support casting 9 in a rigid, light weight print head assembly.

A problem present in much of the prior art is that a good deal of bending is necessary to insert the print wires 3 through the guide means 8 normally employed to produce a tight matrix configuration at the output end 7 of the print head. Tungsten carbide wire materials, while excellent in performance, long life and high print quality, are notoriously brittle and are subject to a good deal of breakage in the manufacturing operation, particularly upon threading the wires 3 through the guide channels 8. Many of the prior art patents illustrate designs which have in part been developed in order to accommodate this deficiency with tungsten carbide or other high strength brittle material wires generally employed.

What has advantageously been employed in the present preferred embodiment is a unitary filament of metalloid element, boron, carbon (graphite), or silicon carbide. Specifically, boron print wires are utilized in the present invention because of the high hardness, toughness and flexibility properties that the unitary continuous boron filament exhibits. The hardness property of boron material has been known in a general way for some time. However, the total thrust of teaching boron for applications has been in composite structures where its flexibility, high tensile strength and toughness properties have long been utilized to advantage. This has occurred to such a widespread extent that it is believed that the hardness characteristic has not been a subject of serious investigation or application. In fact, the use of boron filament material in and of itself for its own sake as a structural element without a binding matrix of resin or some other material has simply not been found in the known prior art. This being the case, the discovery of the present invention has come as a most unexpected and novel development in the art. The results obtained by employing boron filaments as the print wires in a wire matrix printer have been remarkable. As opposed to tungsten carbide, for example, boron exhibits only about 1/5 the density of tungsten carbide but it has a tensile strength of approximately four times that of tungsten carbide and a hardness (KHN or DPH) of approximately twice that of tungsten carbide. It has also a higher surface finish and higher shear strength than tungsten carbide and approximately a 60% higher endurance limit than tungsten carbide. Its modulus of elasticity is high but is less than the tungsten carbide material and costs only a very small fraction as much as an equivalent amount of tungsten carbide as prepared for use in a printer.

As shown in FIG. 2A, a typical boron print wire 3 is attached to an armature 6 and may have a strain relieving epoxy fillet 10 applied at the juncture between the armature and the wire. As shown in a horizontal (side elevation view in FIG. 2B, boron wire 3 and armature 6 are joined together and inserted into a return spring 5 for application in the assembled print head as shown in FIG. 1. Armature 6 is made of magnetic material, preferably steel or iron, and may be staked (hot upset) onto the spring 5 by inserting the ends 6A of armature 6 through apertures in spring 5 and upseting them. This is shown in the end view in FIG. 2C. A rather larger aperture 11 is left in spring 5 to completely clear the sides of wire 3 as shown.

It is particularly important that the boron print wire be firmly attached to the armature 6 and several methods for obtaining this result are shown in the drawings.

In FIG. 3A, a horizontal elevation view of an armature 6 having a central cavity 12 in which boron wire 3 is inserted is shown. The purpose of the cavity 12 is to contain the driven end of a print wire 3. As shown in FIG. 3B, the wire 3 may be held in place by swaging (cold upsetting) the edges of cavity 12 to mould portions of armature 6 over wire 3 to entrap the wire in cavity 12.

Figure 4A:
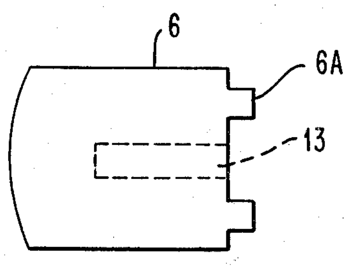
FIG. 4A and 4B illustrate another preferred embodiment of a method of attaching a metalloid print wire to an armature.
Figure 4B:
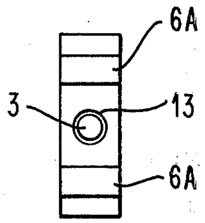

FIGS. 4A and 4b show yet another preferred method of attaching a print wire 3 to an armature 6. In FIG. 4A, a central cavity 13 has been bored in armature 6 to accommodate the end of print wire 3. The diameter of the bore is slightly greater than the external diameter of print wire 3 and the end of the wire 3 is butted into bore 13 and epoxied in place as shown in FIG. 4B in an end view of a completed assembly. The bore 13 may be circular or may be formed in a square or other configuration if desired to provide greater torsional resistance if necessary.

Another similar method of attaching wires 3 to an armature 6 which is not illustrated would be to encapsulate or pot the end of wire 3 in a bore or similar hole in an armature 6 utilizing an expandable white metal alloy containing bismuth or similar material which expands upon freezing (solidification).

Figure 5:
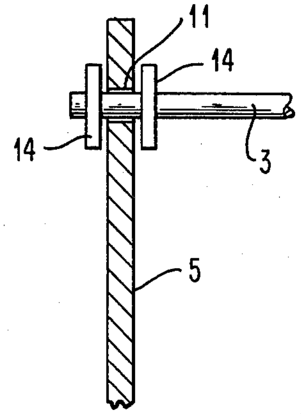
FIG. 5 illustrates yet another preferred method of attaching metalloid print wires to an armature.

FIG. 5A illustrates yet another method of attaching a print wire 3 to the spring 5 by means of one or more swage rings 14 on opposite sides of the spring 5 through which wire 3 passes as shown. The swage rings might be made of magnetic material, thereby providing the function of armature 6 as well.

Figure 6:
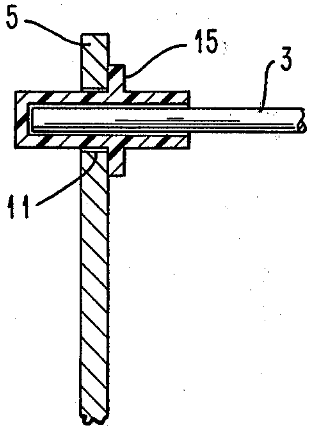
FIG. 6 illustrates still another preferred method of attaching metalloid print wires to a ferrule or other similar means for assembly with a return spring or armature.

FIG. 6 illustrates yet another method of attaching a boron wire 3 to a return spring 5 or to an armature 6 (a return spring 5 is illustrated) in which a plastic or other relatively soft and non-abrasive material in the form of a sleeve 15 is press fitted into an aperture in spring 5. It may be cemented in place with expoxy or similar adhesive if desired. The sleeve 15 serves as a ferrule to accommodate the end of boron wire 3 as shown. The wire 3 may be either pressed into the ferrule (or sleeve) 15 or it may be cemented in place. Alternatively, it may be heated and forced in place and allowed to cool. In the alternative, the plastic material 15 may be cast in place around a wire 3 or may be heated to accommodate the insertion of wire 3 and then allowed to cool. Yet another method of attaching print wires in general to a moving armature is shown in the commonly assigned U.S. Pat. No. 4,000,801.

As will be appreciated by those of skill in the art, the armature 6 illustrated in FIGS. 3 through 4 or the spring element 5 in any of the FIGS. 3 through 6 may be eliminated in the moving core or solenoid type of wire matrix print head driver design. Such electromagnetic drivers are well known as evidenced in the aforementioned patents, but the attachment methods employed could be utilized to advantage in those designs as well. Thus the boron print wire may be employed without modification.

In the embodiment shown in the figures, wire matrix print heads have been tested to approximately one billion impacts without failure of the tip or of the body of the wire. Boron wires of the type tested under such circumstances are commercially available from the Avco Systems Div. of the Avco Corporation. The continuous unitary boron filaments are provided on either a tunsten substrate which represents no substantial part of the boron filament that is produced. A variety of diameters of this filamentary boron material are available. The material is available in continuous lengths and in the 0.011 inch diameter that is preferred in wire matrix printers of this type as shown in the aforementioned U.S. Pat. No. 3,672,482.

In the preferred embodiment, lengths of this continuous material are prepared from the continuous strand as purchased by the following technique:

The continuous length of filament is broken roughly to length, or multiples thereof, with an addition of 1 to 2 extra inches. These pieces are put into a containment tube of glass, paper, or any suitable material. Then they are encased and firmly held together as a stable unit in the tube by an epoxy or other cement. After the epoxy has solidified and has been cured, the single filament or group of boron filament pieces are cut by a diamond cutoff wheel to a length about two (2) wire diameters longer than desired. Each end of the group of encased wire(s) is then ground or lapped to within about one wire diameter of the desired length to eliminate possible failures caused by diamond cutting. The epoxy or cement is then dissolved to free the finished boron filament wires for use.

Following this cutting operation, the wires are attached to the armatures 6, one armature for each wire in the number of print positions in a given print head, and are assembled in the normal course of operation by passing wires 3 through the guide 8 and attaching the return springs 5 to the base casting 9 as shown in FIG. 1.

The high tensile strength and flexibility of the boron wire material, together with its relatively fine surface finish (on the order of 5 to 7 micro inches) yield a lower push- pull force through the guide 8 than the tungsten carbide material which it may replace. This fact, combined with the higher endurance limit in flexure of approximately 60% greater than the tungsten carbide material and its relative lower weight may provide higher armature and wire operating speeds in the combination that makes up the wire matrix printer, thereby providing higher print rates without other modification of the design. In addition, the higher flexibility of the boron wires as compared with tungsten carbide for example, enables it to be easily threaded through even the most tortuous curves in various designs of wire matrix point guides without the fear of breakage or damage that persistently accompanies the use of tungsten carbide print wires. In addition, the boron material costs only a fraction as much as the tungsten carbide material and the overall cost of the print head is greatly reduced because of this factor and because of the fact that the assembly operation and breakage of wires during assembly is so greatly reduced.

As will be appreciated instantly by those of skill in the art, the unobviousness of the present invention in light of the known prior art and especially of the known prior uses and applications for the boron filament material is striking. While it has been known in a general way that boron is a hard material, (see for example the test entitled, *Modern Composite Materials* by L. J. Broutman & R. H. Krock, Chapter 10, Boron Filaments by F. E. Wawner) the hardness properties are nowhere identified, applied or indicated in the literature surrounding the use of boron filament material under its known applications as a composite fiber structural element. In addition, it may be seen that the primary properties of the material and of other similar materials such as graphite or silicon carbide are those in flexure and tension and so it has been used for application in the composite flexural or tensile structures with which it has long been associated.

To use such a fiber in its own right and for its own mechanical properties is nowhere suggested in the art and hence its application in the present invention is felt to be a most unusual and unobvious one. The greatly improved performance, reduced cost, ease of manufacture and maintenance and other improvements in performance of the print head and quality thereof are all a direct result of the application of such materials to the present invention. As will be instantly appreciated by those of skill in the art, this invention will make possible a great simplification or reduction in cost of many designs for wire matrix print heads since the degree of precision and care in constructing guideways, the use of jeweled bearings and other similar expedients and the care and precision required in assembling wire matrix print heads may now be greatly alleviated.

The improvements produced by applying this known material in a new and useful way are significant. While there may be many other advantages as yet unrecognized or unstated which are inherent in the use of non-metallic metalloid filaments as print wires, the results obtained to date have most satisfactorily demonstrated the improvements desired as set forth in the objects of this invention. While many modifications of means for attaching the print wires to armatures, solenoids or moving drivers are apparent, the direct use of a material heretofore only known for use in a matrix composites and which may now be used in its usual filamentary form for its own sake may be appreciated by those in the skill of the art to be a true advance. It is also envisioned that the present invention might be employed by embedding numerous finer strands of metalloid material in a matrix of epoxy or other similar resin to provide a print wire of the desired diameter overall while reducing the threat of breakage or deterioration and simultaneously providing a lubricating surface of the wire through the use of lubricating plastics as the binding matrix, for example. Therefore, while many of the foregoing modifications in the mode of employment in the present invention may be envisioned, what is desired to be protected by Letters Patent is as follows:

What is claimed is:

1. An improved dot matrix printer apparatus having at least one print wire means for impacting a medium to form a mark, at least one electromagnetic print wire driver operably connected with said print wire means for axially reciprocating the same to impact said medium wherein said improvement comprises:
   said print wire means being at least one continuous unitary filament of elemental metalloid material boron.

2. Apparatus as described in claim 1, wherein:
   said metalloid has a modulus of elasticity of approximately $50 \times 10^6$ PSI and a hardness of approximately 3,000 DPH.

3. An improved dot matrix printer apparatus having at least one print wire means for impacting a medium to form a mark, at least one electromagnetic print wire driver operably connected with said print wire means for axially reciprocating the same to impact said medium wherein said improvement comprises:
   said print wire means being at least one continuous unitary filament of elemental metalloid material carbon.

* * * * *